W. S. MILLER.
MECHANICAL MOVEMENT.
APPLICATION FILED JUNE 26, 1913.

1,221,471.

Patented Apr. 3, 1917.

UNITED STATES PATENT OFFICE.

WILLIAM S. MILLER, OF WASHINGTON, DISTRICT OF COLUMBIA.

MECHANICAL MOVEMENT.

1,221,471.   Specification of Letters Patent.   Patented Apr. 3, 1917.

Application filed June 26, 1913. Serial No. 775,937.

*To all whom it may concern:*

Be it known that I, WILLIAM S. MILLER, a citizen of the United States, residing at 3067 Canal street northwest, Washington, in the District of Columbia, have invented certain new and useful Improvements in Mechanical Movements, of which the following is a specification.

This invention relates to improvements in "mechanical movements."

The invention has for its object, primarily, to provide for the actuation of a common endless, motion-transmitting element, as a belt of the crossed type, without liability of its "runs" contacting with each other, as in effecting the actuation of oppositely reciprocated or driven elements from a common means.

A further object is to carry out the aforesaid end in a simple and effective manner, and with reduced friction.

The invention, therefore, consists, generically of a mechanical movement, including a rotary element characterized by the equipment of a spirally arranged plurality of sprocket teeth upon its periphery, with which teeth is adapted to engage an endless belt or motion-transmitting element, it being understood, of course, that by means of this arrangement a rotary reciprocating motion is designed to be transmitted to the shaft to which said rotary member or pulley is in practice, attached for actuating machinery to which it may be desired to impart such motion.

It further consists of detailed structural features and instrumentalities substantially as hereinafter more fully described and defined by the appended claim.

In the accompanying drawing is illustrated the preferred embodiment of my invention wherein it will be understood that various changes and modifications as to the detailed construction and arrangement of the parts may be made without departing from the spirit of the invention, and in which drawing—

Figure 1:
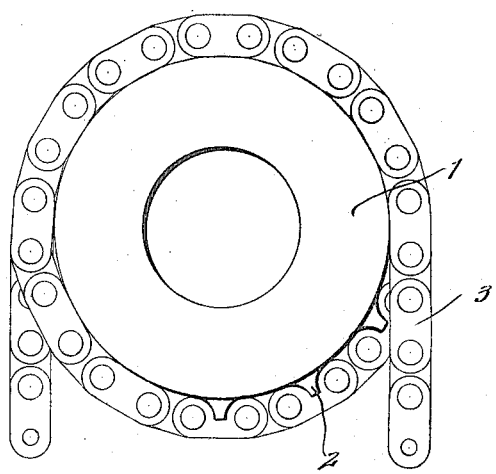
Figure 1 is a perspective view of my invention.
Figure 2:
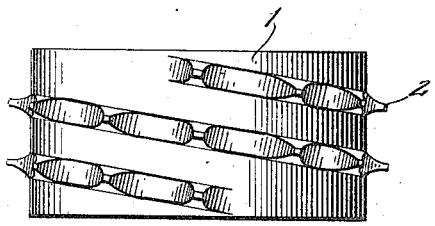
Fig. 2 is a detailed like view of the reciprocal element or sprocket pulley or wheel.

In carrying out my invention I suitably provide a pulley or wheel 1, and equip or arm said wheel or pulley, upon its periphery, with a spirally arranged plurality of sprocket-teeth or cogs 2, being preferably of the outline as disclosed to provide for the engagement therewith of an endless linkbelt 3 of the common type.

With the belt 3 suitably engaged with the teeth of the pulley periphery, as stated, it will be noted that a rotary reciprocatory motion may be imparted to the pulley by suitably actuating the belt as readily understood, and that by causing the belt to encompass or engage simultaneously an oppositely positioned and similarly toothed or cogged pulley and crossing the "runs" of the belt therebetween, as also well understood, the pulleys may be oppositely reciprocated by actuating the belt and that the thus crossed "runs" will not contact with each other, as in the employment of the ordinary sprocket-toothed pulley or wheel as is apparent, and thus provide for reducing friction and avoiding unsatisfactory action of the parts, as is also thought obvious.

Having thus described my invention, what I claim as new is:

A device of the type described including a rotary member having its periphery provided with a plurality of sprocket teeth arranged to traverse the periphery spirally for engagement with a sprocket-chain, said spiral arrangement of teeth, holding the leads apart so that they will not contact each other at the point at which they pass one another, said spirally toothed sprocket rotary member being employed where it is desired to impart a reverse reciprocatory movement from a shaft to a shaft on which said spirally toothed member is keyed.

In testimony whereof I affix my signature in presence of two witnesses.

WILLIAM S. MILLER.

Witnesses:
 WILLIAM XANDER,
 R. R. DUFFIE.

Copies of this patent may be obtained for five cents each, by addressing the "Commissioner of Patents, Washington, D. C."